US011358363B2

United States Patent
Schurr et al.

(10) Patent No.: US 11,358,363 B2
(45) Date of Patent: Jun. 14, 2022

(54) LIGHT-TIGHT SHRINK WRAPPING FILM

(71) Applicant: KLÖCKNER PENTAPLAST EUROPE GMBH & CO. KG, Heiligenroth (DE)

(72) Inventors: Manuel Schurr, Heiligenroth (DE); Christian Dux, Tüßling (DE); Günther Deiringer, Kastl (DE)

(73) Assignee: KLOCKNER PENTAPLAST EUROPE GMBH & CO. KG, Heiligenroth (DE)

( * ) Notice: Subject to any disclaimer, the term of this patent is extended or adjusted under 35 U.S.C. 154(b) by 924 days.

(21) Appl. No.: 15/781,441

(22) PCT Filed: Dec. 5, 2016

(86) PCT No.: PCT/EP2016/079791
§ 371 (c)(1),
(2) Date: Jun. 4, 2018

(87) PCT Pub. No.: WO2017/093572
PCT Pub. Date: Jun. 8, 2017

(65) Prior Publication Data
US 2020/0282688 A1    Sep. 10, 2020

(30) Foreign Application Priority Data

Dec. 3, 2015 (EP) ..................................... 15197908

(51) Int. Cl.
| B32B 1/08 | (2006.01) |
| B32B 27/08 | (2006.01) |
| B32B 27/20 | (2006.01) |
| B32B 27/30 | (2006.01) |
| B32B 27/32 | (2006.01) |
| B32B 27/36 | (2006.01) |

(52) U.S. Cl.
CPC ................ *B32B 1/08* (2013.01); *B32B 27/08* (2013.01); *B32B 27/20* (2013.01); *B32B 27/302* (2013.01); *B32B 27/304* (2013.01); *B32B 27/32* (2013.01); *B32B 27/36* (2013.01); *B32B 2250/24* (2013.01); *B32B 2264/108* (2013.01); *B32B 2264/1022* (2020.08); *B32B 2270/00* (2013.01); *B32B 2307/4026* (2013.01); *B32B 2307/516* (2013.01); *B32B 2307/538* (2013.01); *B32B 2307/736* (2013.01); *B32B 2307/75* (2013.01); *B32B 2597/00* (2013.01)

(58) Field of Classification Search
CPC ................ B32B 27/08; B32B 2307/75; B32B 2307/736; B32B 2307/538; B32B 2250/24; B32B 2307/4026; B32B 27/36; B32B 27/32; B32B 27/304; B32B 27/302; B32B 27/20
See application file for complete search history.

(56) References Cited

U.S. PATENT DOCUMENTS 5,693,405 A * 12/1997 Harvie .................... B29C 59/04
428/156

FOREIGN PATENT DOCUMENTS

| DE | 102007018182 A1 | 10/2008 |
| EP | 1616695 A1 | 1/2006 |
| EP | 2298665 A1 | 3/2011 |
| JP | S61235139 A | 10/1986 |
| JP | 2003267437 A | 9/2003 |
| JP | 2010047006 | * 3/2010 |

OTHER PUBLICATIONS

Written Opinion dated Oct. 19, 2017 for PCT Application No. PCT/EP2016/079791.
International Search Report dated Feb. 10, 2017 for PCT Application No. PCT/EP2016/079791.
International Preliminary Examination Report dated Feb. 16, 2018 for PCT Application No. PCT/EP2016/079791.

* cited by examiner

*Primary Examiner* — Michael C Miggins
(74) *Attorney, Agent, or Firm* — Moser Taboada

(57) ABSTRACT

The invention relates to a heat-shrinkable film comprising a first polymer ply A comprising at least one dark pigment, a second polymer ply B comprising at least one white pigment, wherein the thickness ratio of the first ply A is in the range of 5:95 to 50:50, the film has a thickness of 20 μm bis 100 μm, the light transmission of the film is not more than 12%, and the film after 15 seconds in a water bath having a temperature of 95° C. exhibits shrinkage in a main shrinking direction in the range of 20% to 85%. The invention further relates to a hose comprising such a heat-shrinkable film and to a process for producing such a heat-shrinkable film.

20 Claims, No Drawings

LIGHT-TIGHT SHRINK WRAPPING FILM

The invention relates to a heat-shrinkable film with a first polymer ply comprising a dark pigment and a second polymer ply comprising a white pigment.

Heat-shrinkable polymer films are commonly used to wrap other objects. These objects are commonly objects consisting of plastic or glass, such as bottles, tubs or boxes for storage. The films are intended to provide several functions. For example, it should be possible to print on them, to indicate the contents of the wrapped object, for example. To this end, it is necessary that the colour of the film does not have a disruptive effect on a printing ink to be applied. Furthermore, the films should have, as far as possible, suitable haptics so that they can be held in the hand in a secure and slip-free manner. In particular if the objects such as bottles or tubs are intended to accommodate foodstuffs, for example, beverage bottles, yoghurt pots or tubs for salad and the like, it is necessary to keep the passage of light into the interior of the bottles, tubs or boxes as low as possible to minimise the loss in quality of the stored foodstuffs during the storage period. If light passes through, this can result for example in the degradation or alteration of valuable, light-sensitive ingredients of the foodstuffs, for example in the denaturing of vitamins such as vitamins B2 or C, or in the oxidation of unsaturated fatty acids. In particular the UV fraction of the light can contribute to this.

Attempts have therefore been made in the past to reduce the light-permeability of films by means of additives. For instance, laid-open application DE 102006051657 A1 describes a polyester film with a layer which contains a pigment providing a white colour. This film is intended to have a transparency of less than 60%; 22% was achieved in one comparative example. Furthermore, laid-open application DE 102005025233 A1 describes a white, opaque film containing barium sulphate and titanium dioxide. A transparency within the range of 16.5 to 17.5% was achieved with this film.

However, these levels of transparency are still insufficient. Much lower levels of transparency are desirable, in particular if a film is to be used for the storage of foodstuffs having light-sensitive ingredients over a relatively long period.

Attempts have therefore been made in the past to reduce the light-permeability of polymer films by printing on them with black ink. However, the effect achieved thereby is rather small, since only a comparatively thin black layer can be applied for technical reasons. Furthermore, the total outlay increases owing to the required post-processing step of printing. In addition, such printed films generally have defects after the wrapping of objects, for example owing to damage to the printed layer resulting from handling of the film or else owing to further processing steps, since two edges of a film usually have to be joined to each other, for example by solution sealing or heat sealing. The design is then made streaky at the sealing points owing to the different colour impression. Also, an increased amount of light can enter the object surrounded by the polymer film, for example a bottle, a tub or a box with a beverage or other foodstuff therein, at these points. Furthermore, the black printed layer has a disruptive effect if additional printing is also required, for instance to indicate what product an object wrapped in such a polymer film contains.

The object of the invention therefore consists in providing heat-shrinkable polymer films with further reduced light transmission and a process for the production thereof. Also, as far as possible, polymer films should be provided which have haptics allowing an object wrapped in such a polymer film to be held securely. A further desirable aspect is an ability to be printed on easily, since the polymer film, when used in practice to wrap an object, is generally provided with information on the wrapped object or the contents thereof. The ability to be printed on easily means that the polymer film in particular should not have a disruptive effect on the printing ink to be applied, for example should not alter the colour impression of the printing ink, and thus should in particular provide a surface which is as far as possible not discoloured, onto which other inks can be applied.

Furthermore, the provided polymer films should, as far as possible, have a low density in order ultimately to save weight. A low thickness is also desirable so that more polymer film can be wound onto rolls, compared with a thicker film, while keeping the weight the same, that is, so that the area yield in m2/kg is increased.

The invention results from the features of the independent claims. Advantageous developments and embodiments form the subject matter of the dependent claims.

The object is achieved in a first aspect by a heat-shrinkable, uniaxially stretched film comprising a first polymer ply A which comprises at least one dark pigment, and also comprising a second polymer ply B, which comprises at least one white pigment, wherein the light transmission of the film is not more than 12%, for example not more than 10%, preferably not more than 5%; the film has a thickness of 20 μm to 100 μm; the thickness ratio of the first polymer ply A to the second polymer ply B is in the range of 5:95 to 50:50; and the film after 15 seconds in a water bath at 95° C. exhibits shrinkage in the range of 20% to 85%. To achieve heat-shrinkability, the heat-shrinkable film is stretched in one direction; the stretching results in the film after 15 seconds in a water bath at a temperature of 95° C. exhibiting shrinkage in a main shrinking direction in the range of 20% to 85%, for example 50 to 75%, for instance 65% to 75%. Stretching is possible in particular in a transverse direction or in a machine direction, in relation to the device used for the production of the heat-shrinkable film. According to a particular embodiment, stretching takes place in the transverse direction so that the main shrinking direction is also the transverse direction and no shrinkage occurs in a secondary shrinking direction.

Even with uniaxial stretching, however, a slight change in dimension, in particular shrinking, can also occur in a secondary shrinking direction when the polymer film is shrunk, but this usually remains in a low range of ±10%, in particular ±5%, for example ±2%, and therefore films having such shrinkage in a secondary shrinking direction are also still included.

The first polymer ply A and the second polymer ply B comprise, independently of each other, one or more polymers which are selected from the group of polyesters, polyolefins, polystyrenes and polyvinyl halides, including copolymers of polyesters, polyolefins, polystyrenes and polyvinyl halides.

In relation to the total weight of a ply, the polymer(s) make up the main fraction, preferably at least 70, at least 80, at least 85 or at least 90 wt % (percent by weight).

Polyesters mean routine polymers in the art which result from esterification of divalent or higher-valent carboxylic acids with divalent or higher-valent alcohols, including copolyesters. Non-limiting examples of the acid components of corresponding polyesters are dicarboxylic acids, for example terephthalic acid, oxalic acid, malonic acid, succinic acid, adipic acid, azelaic acid (1,7-heptane dicarboxylic acid), sebacic acid (1,8-octane dicarboxylic acid), phthalic acid, isophthalic acid, naphthalenedicarboxylic acid, diphenyl ether dicarboxylic acid, maleic acid, itaconic acid, 1,3-cyclohexane dicarboxylic acid and 1,4-cyclohexane dicarboxylic acid. Non-limiting examples of the alcohol components of corresponding polyesters are diols such as 1,2-ethanediol, 1,2-propanediol, 1,3-propanediol, 1,2-butanediol, 1,3-butanediol, 2,3-butanediol, 1,4-butanediol, 2-methyl-1-propanediol, hexanediol, in particular 1,6-hexanediol, diethylene glycol, 1,4-cyclohexanedimethanol, 1,5-pentanediol, 1,8-octanediol, 2,2,4-trimethyl-1,3-pentanediol, propylene glycol, 2,2,4,4-tetramethyl-1,3-cyclobutanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, thiodiethanol, 1,2-cyclohexanedimethanol, 1,3-cyclohexanedimethanol and 1,4-benzenedimethanol, and polyalkylene glycols such as polyethylene glycol or polypropylene glycol. However, the first polymer ply A and the second polymer ply B in polyester-containing heat-shrinkable films are not limited to dicarboxylic acids and diols; rather, higher-valent carboxylic acids and/or higher-valent alcohols can also be used. The polyester of the first polymer ply A and the polyester of the second polymer ply B can comprise, independently of each other, one or more acid components and/or one or more diol components, polyesters including both homopolyesters and copolyesters. The polymers of the first polymer ply A and of the second polymer ply B can be identical to or different from each other.

In the case of a polyester-containing heat-shrinkable film, the first polymer ply A and the second polymer ply B can comprise the same polyester or the same mixture of different polyesters, or alternatively different polyesters and/or polyester mixtures. Furthermore, the respective polyesters in the first polymer ply A and in the second polymer ply B can be the only polymers. Alternatively, the first polyester ply A and the second polyester ply B can comprise, independently of each other, polymers other than polyester, as long as the polyester forms the main fraction of polymer in percent by weight, preferably at least 50 percent by weight, in relation to the polyester ply in question. Examples of polymers which are not polyester are polyamides or polymers of the group of polyolefins, polyvinyl chlorides or polystyrenes. If the first polymer ply A and/or the second polymer ply B contain polymers which differ from the polyester in the same ply in terms of polarity, the same ply can comprise one or more compatibilisers as additives. Compatibilisers act as phase mediators and are for example amphiphilic substances which mediate between a more polar phase and a more apolar phase or are block polymers, diblock polymers or graft polymers which can mediate between phase boundaries. Examples of compatibilisers which can be used in particular in plies comprising styrene or corresponding styrene copolymers are styrene maleic anhydride, for example poly(styrene maleic anhydride) sold under the brand name XIRAN® such as XIRAN® SZ 0820, XIRAN® SZ 15170 and similar manufactured by Polyscope (Geleen, Netherlands). According to a particular embodiment, the heat-shrinkable film does not comprise any polymers other than polyesters in addition to one or more polyesters in the first polymer ply A and the second polymer ply B. According to a particular development, the first polymer ply A, which comprises only polyesters as polymers, and the second polymer ply B, which likewise comprises only polyesters as polymers, comprise at least one common polyester.

Polyolefins mean routine alkene-based polymers and copolymers in the art, examples of monomers being in particular ethylene, propylene, 1-butene and isobutene as well as linear or branched alpha-olefins and cyclic olefins, and non-limiting examples of additional comonomers being vinyl acetates, acrylates and/or acrylic acid. Non-limiting examples of polyolefins are polypropylenes and polyethylenes such as high-density polyethylene (HDPE) and in particular low-density polyethylene (LDPE) and linear low-density polyethylene (LLDPE).

Polystyrenes mean routine polymers or copolymers of styrene. Examples of copolymers are styrene butadiene copolymers. Examples of suitable styrene butadiene copolymers are those offered under the names "Clearen 511L", "Clearen 631M" or "Clearen 740M" by Denka Kagaku Kogyo Kabushiki Kaisha (Tokyo, Japan), "K-Resin® SBC" by Chevron Phillips Chemical Company LLC (The Woodlands, Tex., USA) and various styrene butadiene copolymers offered under the brand name "Styrolux" by Styrolution GmbH (Frankfurt, Germany).

A styrene butadiene copolymer can also be a combination of at least two different styrene butadiene copolymers. Such combinations are used to set desired properties, for example melting behaviour, viscosity, stiffness or shrinking behaviour, by varying the proportions of the individual styrene butadiene copolymers. An example of such individual styrene butadiene copolymers which can be combined in different mixtures is the system of "Styrolux S" and "Styrolux T" from Styrolution GmbH (Frankfurt, Germany); these individual styrene butadiene copolymers can be combined in different proportions with each other to set, for example, a desired level of stiffness and natural shrinkage.

Polyvinyl halides mean polymers and copolymers of vinyl halides, for example polyvinyl chlorides and polyvinyl fluorides. Examples of comonomers are vinyl acetate, vinylidene chloride, acrylic acid, fumaric acid, itaconic acid, methacrylic acid, maleic acid and vinylphosphonic acid and esters thereof with an alcohol component of 1 to 10 carbon atoms, in particular 1 to 7 carbon atoms, acrylonitrile, styrene and graft copolymerisates consisting of vinyl chloride, butadiene and acrylonitrile, and polymer mixtures of the above polymerisates.

The first polymer ply A and the second polymer ply B preferably each comprise polymers from the same group. Since the polymers can be selected from the groups of polyesters, polyolefins, polystyrenes and polyvinyl halides, polymers of the same group are selected as the main polymers, in relation to the weight percentage of the respective ply, or as single polymers for example for the first polymer ply A and the second polymer ply B, although one or more polymers from one or more different groups can optionally be present as secondary polymers with a weight percentage in the respective ply which is lower than the main polymers, preferably not more than 25 wt %. Accordingly, if a first polymer ply A mainly or only comprises polyesters as polymer or polymers in relation to the weight percentage in this ply, mainly or only polyesters would also be used for the second polymer ply B, so that the first polymer ply A is a first polyester ply A and the second polymer ply B is a second polyester ply B. Analogously, if a first polymer ply A mainly or only comprises polyolefins as polymer or polymers in relation to the weight percentage in this ply, mainly or only polyolefins would also be used for the second polymer ply B, so that the first polymer ply A is a first polyolefin ply A and the second polymer ply B is a second polyolefin ply B. Analogously, if a first polymer ply A mainly or only comprises polystyrenes as polymer or polymers in relation to the weight percentage in this ply, mainly or only polystyrenes would also be used for the second polymer ply B, so that the first polymer ply A is a first polystyrene ply A and the second polymer ply B is a second polystyrene ply B. Likewise, if a first polymer ply A mainly or only comprises polyvinyl halides as polymer or polymers in relation to the weight percentage in this ply, mainly or only polyvinyl halides would also be used for the second polymer ply B, so that the first polymer ply A is a first polymer polyvinyl halide ply A and the second polymer ply B is a second polyvinyl halide ply B. However, it is also possible in the above cases for a ply to comprise, in addition to one or more main polymer constituents of a common group, a smaller proportion of one or more polymers of one or more different groups.

The heat-shrinkable film can consist of the first polymer ply A and the second polymer ply B or can comprise one or more further plies in addition to the first polymer ply A and the second polymer ply B. Examples of such plies are repetitions of the first polymer ply A and/or the second polymer ply B, so that, for example, the first polymer ply A appears multiple times in one film. Further examples of such plies are plies which contain one or more polymers selected independently of each other from the group of polyesters, polyolefins, polystyrenes and/or polyvinyl halides and/or further groups of polymers but contain neither a dark pigment nor a white pigment, wherein adhesion promoters and/or one or more pigment plies, for instance as part of a print, may be arranged between the plies. The first polymer ply A and the second polymer ply B are preferably directly adjacent to each other. The heat-shrinkable film consists according to one embodiment of the first polymer ply A and the second polymer ply B, according to an alternative embodiment of the first polymer ply A, the second polymer ply B and at least one pigment ply which is applied to the second polymer ply B and is a print.

A further example of a ply is a ply which comprises or consists of a sealing wax, in particular a hot-sealing wax. According to a further embodiment, the heat-shrinkable film consists of the first polymer ply A, the second polymer ply B, and at least one further polymer ply which contains neither a white pigment nor a dark pigment. For example, according to this further embodiment, the heat-shrinkable film consists of the first polymer ply A, the second polymer ply B, and exactly one further polymer ply which contains neither a white pigment nor a dark pigment. The at least one further polymer ply without white pigment or dark pigment for example is adjacent to the second polymer ply B, preferably the first polymer ply A. If there are multiple plies without white pigment or dark pigment, that is, pigment-free plies, these can be adjacent to the first polymer ply A and/or the second polymer ply B, but preferably the first polymer ply A.

If the polymers or main polymers of a ply originate from different groups in comparison with the polymers or main polymers of an adjacent ply, which are not compatible with each other, for example differ in polarity, one or both of the adjacent plies can comprise one or more compatibilisers as additives. Compatibilisers provide compatibility and act for example as phase mediators and are for example amphiphilic substances which mediate between a more polar phase and a more apolar phase or are block polymers, diblock polymers or graft polymers which can mediate between phase boundaries.

The first polymer ply A and/or the second polymer ply B can consist solely of the polymer(s) and the dark pigment(s) or the white pigment(s) or can comprise further constituents which may also be constituents of other plies of the heat-shrinkable film. Examples of further constituents are additives such as further dyes; brighteners; matting agents; stabilisers such as stabilisers against light or UV radiation; anti-blocking additives such as organic fillers, silicates or waxes; lubricants for influencing the melt viscosity; anti-static agents; anti-oxidants; flame retardants; hydrolysis inhibitors; and modification agents, for instance for influencing properties such as heat resistance or impact resistance, or nucleating agents, cavity-forming additives, or the compatibilisers already discussed. Proportions of such additives in the respective polymer ply are preferably not more than 15 percent by weight, preferably not more than ten percent by weight, in particular not more than five percent by weight, in relation to the total weight of the respective ply. In contrast, the proportion of cavity-forming additives in the respective ply can for example be up to 40 wt %, for example up to 30 wt %, for example 5 to 30 wt %, in particular 5 to 25 wt %.

The at least one dark pigment can be an inorganic or an organic dark pigment. Non-limiting examples of inorganic dark pigments and in particular black pigments are pigments based on fine metal particles, for example with a diameter of up to not more than a few micrometres, and also pigments based on metal compounds such as iron oxide brown or iron oxide black, mixed iron manganese oxides, spinel black (copper chromites such as Co(Cr,Fe)2O4), Cu(Cr,Fe,Mn) 2O4). Non-limiting examples of organic dark pigments and in particular black pigments are aniline black (CAS 13007-86-8), pigment mixtures available under the collective name "pigment black", bone char, graphite, (charcoal), and soot, in particular carbon black. A person skilled in the art is familiar with the concept of carbon black, which is produced for example as combustion soot from incomplete combustion of hydrocarbons or as thermal black from thermal decomposition. Carbon black is conventionally produced in thermal reactors, in particular furnaces, in which a fuel is burned in a controlled manner together with air, as described for example in U. S. Pat. No. 7,431,909 B1 and U. S. Pat. No. 7,655,209 B2. The dark pigments can be used individually or in combinations of two or more dark pigments. In a particular embodiment, the dark pigment comprises fine metal particles or consists solely thereof. In a further particular embodiment, the dark pigment comprises both fine metal particles and soot and/or carbon black, or consists thereof. According to yet another particular embodiment, the dark pigment comprises soot and/or carbon black, or consists solely of soot and/or carbon black. The average particle diameter of the soot and/or carbon black is preferably within a range of 20 nm to 100 nm. With soot and/or carbon black, a pigment is advantageously used which provides an effective light barrier across the entire relevant wavelength range of 360 nanometres to 750 nm, in particular within a wavelength range of 360 to 560 nm, and has no disadvantageous properties during the stretching required for producing a heat-shrinkable film. To block the light transmission sufficiently in interaction with the white pigments of the second polymer ply B and at the same time to provide a white polymer ply B which is not spoiled by the effect of the dark pigments of the first polymer ply A, the weight percentage of the dark pigment(s) in the first polymer ply A is preferably at least 0.5 wt %, in particular at least 0.75 wt %. The weight percentage of the dark pigment(s) in the first polymer ply A is preferably not more than 6%, in particular not more than 4 percent by weight, for example 0.5 to 3.5 percent by weight, for instance 0.75 to 3.0 percent by weight. The proportion of the dark pigment(s) in the entire film is for example 0.05 wt % to 3.0 wt %, for instance 0.05 wt % to 2.0 wt % or 0.1 wt % to 2.0 wt %, but, with regard to a film having the lowest possible content of dark pigment, the objectives of sufficiently low light transmission and a surface of the second polymer ply B which appears white for printing purposes can also be achieved by films having a proportion of the dark pigment(s) within the range of 0.05 wt % to 1.0 wt %, for example 0.1 wt % to 1.0 wt % or 0.1 wt % to 0.9 wt %.

The at least one white pigment can be an inorganic or an organic white pigment. Non-limiting examples of inorganic white pigments are barium sulphate, calcium carbonate, titanium dioxide, zinc oxide, zinc sulphide or mixtures of two or more representatives thereof. Non-limiting examples of organic white pigments are the naphthalenetetracarboxylic acid imides described in laid-open application DE 102007061307 A1 or the alkylene bismelamine derivatives described in laid-open application DE 4334735 A1. According to a particular embodiment, the white pigment comprises titanium dioxide or consists solely of titanium dioxide. The proportion of the white pigment(s) in the second polymer ply B is preferably 3 to 23 wt %, for instance 3 to 21 wt % or 3 to 20 wt %, for example 5 to 13 wt % or 6 to 9 wt %.

The at least one dark pigment and the at least one white pigment are preferably used in particle sizes which allow homogeneous incorporation of the particles in the first polymer ply A and/or second polymer ply B and do not form cavities around the particles during stretching in the production of the heat-shrinkable films. Corresponding particles sizes are for example those in the single-figure micrometre range or in the sub-micrometre range. For example, titanium dioxide is preferably used with an average particle size in the sub-micrometre range, for instance of 0.2 to 0.8 µm, for example approximately 0.3 µm.

According to a particular embodiment, the first polymer ply A comprises soot and/or carbon black as the dark pigment, and the second polymer ply B comprises the white pigment titanium dioxide. In particular, soot and/or carbon black and titanium dioxide can be the only dark pigments and white pigment.

The thickness ratio of the first polymer ply A and the second polymer ply B is within the range of 5:95 to 50:50, for example within the range of 20:80 to 30:70. The thickness of the second polymer ply B is preferably at least 1.5 times, preferably at least 2.3 times, the thickness of the first polymer ply A, for example at least 4 times. For example, if a film thickness is 35 to 45 µm in total, the thickness of the first polymer ply A is 7 to 10 µm.

The heat-shrinkable film has a thickness of 20-100 µm, according to particular embodiments a density of less than 50 µm. For example, the thickness is within a range of 30 µm to 45 µm, for instance 40 µm. The thickness deviations are preferably within a range of not more than ±10%. If the film has, in addition to the first polymer ply A and the second polymer ply B, one or more further plies which contain neither a white pigment nor a dark pigment, the total thickness of such plies is preferably not more than 30%, in particular not more than 25%, for instance not more than 20%, not more than 15%, not more than 10% or not more than 5% of the thickness of the film.

The problems of the prior art are solved with such a heat-shrinkable film. The second polymer ply B, with the at least one white pigment thereof, helps to reduce the light transmission of the film. In combination with the first polymer ply A, the light transmission of the heat-shrinkable film is reduced overall to a value of not more than 12%, for example not more than 10%, for example not more than 5%, for instance not more than less than 1%, in relation to a wavelength range of 360 nm to 750 nm. Heat-shrinkable films with such light transmissions are regarded herein as light-tight. According to a particular embodiment, the light transmission does not need to be less than 0.07%, since lower light transmissions do not provide any substantial additional protection of light-sensitive foodstuffs in practice. Accordingly, in this embodiment, the light transmission is within a range of 0.07% to 12%, or 0.07% to 10%, in particular 0.07% to 7%, in particular 0.07% to 5%, for instance 0.07% to 1.5%. The wavelength range of 360 nm to 750 nm covers in particular harmful wavelengths in the UV range and the wavelengths in which many foodstuff ingredients, such as plant ingredients, in particular chlorophylls, absorb, and therefore a reduction in the transmission of the heat-shrinkable film within these wavelength ranges in particular in the wrapping of foodstuffs.

Such a film is a substantial simplification compared with conventional films, which had to be printed on once or even multiple times with black ink to achieve light-tightness. The light transmission can be set in particular by means of the content of dark pigment, and furthermore the first polymer ply A can be covered in a targeted manner in terms of colour by covering with the second polymer ply B. In contrast to a film with which a ply of dark pigments is applied as a print to a surface, the film according to the invention can easily be joined to form a hose, since the dark pigments in the polymer ply are integrated and thus, during joining polymers adhere to polymers, whereas a film with a pigment ply can be joined less easily.

The heat-shrinkable film is thus also suitable for wrapping light-sensitive goods or containers for light-sensitive goods such as foodstuffs.

In view of the small proportion of the first polymer ply A in the heat-shrinkable film, the film overall can be recycled easily, since this small proportion of dark pigment is hardly or not noticeable in terms of colour when the reused material is used in other plastic materials. Likewise, during production of the heat-shrinkable film, waste material can easily be added back to the material provided for the production of the first polymer ply A. The separation of the dark first polymer ply A and the light second polymer ply B also advantageously means that, with the second polymer ply B, which as a side effect contributes to the reduction in transmission of the polymer film, a surface which is white and thus extremely easy to print on in terms of colour is provided, since the white colour of this surface ensures that applied printed inks are not discoloured. Since the second polymer ply B has at least the same thickness as the first polymer ply A, it is advantageously ensured that the dark pigment of the first polymer ply A does not influence, in particular does not show through the colour impression produced by the at least one white pigment of the second polymer ply B. Showing through in this manner would result in darkening, but is not likely with the heat-shrinkable film according to the invention, and therefore the second polymer ply B actually appears white. All these properties have been realised with a film which is comparatively thin and thus contributes only slightly to the weight of the object which is to be wrapped by the heat-shrinkable film. To ensure a white surface of the second polymer ply B, the first polymer ply A can comprise, in addition to the at least one dark pigment, at least one white pigment, for example a proportion of up to 10 wt %, for instance up to 7.5 wt % or 7.0 wt %, for example a weight percentage within a range of 5 wt % to 10 wt %, for instance 6 wt % to 8 wt %. While the proportion of the white pigment(s) in a film without white pigment in the first polymer ply A is 5 wt % to 10 wt % in relation to the total film, the weight percentage of white pigment in a first polymer ply A which comprises at least one white pigment can be for example up to 20%, for instance up to 14% or up to 10%, for example 7% in relation to the total film. White pigment in the first polymer ply A causes the first polymer ply A to be lighter than a white-pigment-free first polymer ply A. Consequently, it is easier to achieve a white surface by covering with the second polymer ply B, since the latter no longer has to cover a dark surface, but merely an already lighter surface.

According to one embodiment, the first polymer ply of the heat-shrinkable film comprises a polymer having a long crystallisation half-time. As a result, crystallisation of the polymer, which could lead to the formation of visually unappealing spots, for example white spots, and could also have a negative effect on the shrinkage properties of the heat-shrinkable film, is reduced or completely prevented during production of the heat-shrinkable film. The crystallisation half-time can be determined using differential scanning calorimetry (DSC). To determine the crystallisation half-time, which is also described in patent document EP 01 066339 B1, in Claim 1 and on page 3, lines 1-22 of the description with reference to polyester, 15 mg of a polyester to be measured is heated to 290° C., then cooled to a predetermined isothermal crystallisation temperature at a rate of 320° C. per minute in the presence of helium, and the time span necessary until reaching the isothermal crystallisation temperature or the crystallisation peak of the DSC curve is determined. The crystallisation half-time can be determined from the plot of the crystallisation over time and corresponds to the time needed to achieve 50% of the maximum achievable crystallinity in the sample at the given temperature.

A half-time of at least 5 minutes of the corresponding molten polymer is regarded as a long crystallisation half-time. Non-limiting examples of polyesters as examples of polymers having a long crystallisation half-time are polyesters consisting of one or more dicarboxylic acids and one or more diols, the dicarboxylic acids being selected from terephthalic acid, maleic acid, itaconic acid, phthalic acid, naphthalenedicarboxylic acid, 1,3-cyclohexane dicarboxylic acid, 1,4-cyclohexane dicarboxylic acid, isophthalic acid and mixtures of two or more representatives thereof, and the diols being selected from diols having 2 to 10 carbon atoms and mixtures of two or more representatives thereof and/or being selected from 1,3-propanediol, 1,4-butanediol, 1,5-pentanediol, 1,6-hexanediol, 1,8-octanediol, 2,2,4-trimethyl-1,3-pentanediol, propylene glycol, 2,2,4,4-tetramethyl-1,3-cyclobutanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, thiodiethanol, 1,2-cyclohexanedimethanol, 1,3-cyclohexanedimethanol and 1,4-cyclohexanedimethanol, 1,4-benzenedimethanol. According to a particular embodiment, the polyesters contain at least 80 mol % of one or more dicarboxylic acids as listed above and also 80 to 100 mol % or one or more diols selected from diols having 2 to 10 carbon atoms and mixtures of two or more representatives thereof, and 0 to 20 mol % of a modified diol selected from 1,3-propanediol, 1,4-butanediol, 1,5-pentanediol, 1,6-hexanediol, 1,8-octanediol, 2,2,4-trimethyl-1,3-pentanediol, propylene glycol, 2,2,4,4-tetramethyl-1,3-cyclobutanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, thiodiethanol, 1,2-cyclohexanedimethanol, 1,3-cyclohexanedimethanol and 1,4-cyclohexanedimethanol, 1,4-benzenedimethanol, the dicarboxylic acid or dicarboxylic acids adding up to 100 mol % dicarboxylic acid and the diol(s) adding up to 100 mol % diol. Examples of polyesters having a long crystallisation half-time are commercially available amorphic or semicrystalline polyesters, for example glycol-modified or cyclohexanedimethanol-modified polyethylene terephthalates. "Embrace®" or "Embrace® LV" manufactured by Eastman Chemical Company, in which a cyclohexanedimethanol glycol (CHDM) component is used in addition to terephthalic acid and ethylene glycol as comonomers can be mentioned as examples. Further examples are sold under the brand names "Eastman Copolyester", "Eastar®" PETG, Copolyester 6763, or Cadence® by Eastman Chemical Company or under "Radicron®" by Radici Plastics, USA, the latter being a neopentyl-glycol-modified polyester.

With the film described herein, a film is provided which has very low light transmission, is very thin, can be produced in the simplest form as a two-ply film, and provides a very white surface which in particular minimises discolouration when prints are applied subsequently.

According to a particular embodiment, the second polymer ply B comprises a polymer having a long crystallisation half-time. According to yet another embodiment, both the first polymer ply A and the second polymer ply B, independently of each other, comprise a polymer having a long crystallisation half-time. The polymer(s) having a long crystallisation half-time of the first polymer ply A and of the second polymer ply B can be identical or different, and are identical according to a particular embodiment.

According to one embodiment, the second polymer ply B of the heat-shrinkable film has an L* value of at least 85. The L* value relates to the L*a*b* colour space, which is known to a person skilled in the art and is standardised by the International Commission on Illumination (CIE, "Commission internationale de l'éclairage"), and in which the L* axis denotes the lightness, the a* axis denotes the green-red component and the b* axis denotes the blue-yellow component of a colour. A surface formed by the second polymer ply B with such an L* value of at least 85 is particularly suitable as the substrate for applying a pigment ply, for instance as a print, wherein the colour or colours of the pigment ply are not or are not substantially darkened or discoloured by the second polymer ply B. The L* value is for example at least 87, and/or is for example within a range of 87 to 95, for instance 88 to 94, 89 to 93 or 90 to 92.

According to one embodiment, at least one of the surfaces which face away from each other of the first polymer ply A and of the second polymer ply B is smooth.

Preferably, both surfaces are smooth. A smooth surface means a surface with a surface roughness Rz of less than 1.5 µm and/or a gloss value at 60° of more than 80, measured according to DIN 67530. A smooth surface is advantageously suitable for heat-shrinkable films which are to give a high-gloss impression or are to be provided with an extremely detailed print. Such smooth surfaces of the first polymer ply A and of the second polymer ply B can be produced if the corresponding polymer plies are preferably free of cavities and also as free as possible from particles. The density of corresponding smooth polymer films is for polyester films for example in the range of 1.30 to 1.50 g/cm$^3$, for instance 1.40 to 1.45 g/cm$^3$, for example approximately 1.42 g/cm$^3$.

According to a further embodiment, the second polymer ply B has a roughness Rz of more than 2.0 µm, for example a roughness Rz within the range of 4-6 µm. Such a roughness produces advantageous haptics of the surface of the second polymer ply B, resulting in a film which is not slippery but rather has paper-like haptics. If an object is wrapped in such a heat-shrinkable film, and the first polymer ply A faces the object and the haptics thereof are irrelevant in this respect, whereas the second polymer ply B faces away from the object, that is, outwards, and therefore the surface thereof is grasped by a user of the object, the object lies in the hand in a comparatively non-slip manner owing to the contact between the second polymer ply B and the hand of the user. Alternatively or additionally, the film has a peak count in the range of 120 to 400 peaks/cm, for example 150-350 peaks/cm, and/or a gloss, measured at 60°, of less than 10, for example 2.5 to 8.5, or 3.0 to 7.0, or 4 to 6, for example 5. The first polymer ply A can have a smooth surface or likewise a rough surface, the roughness Rz of which is identical to or different from the roughness Rz of the second polymer ply B. For example, both surfaces have an Rz of more than 2 µm.

A corresponding surface roughness can be provided, for example, by guiding the heat-shrinkable film during production through a pair of rolls consisting of a normal roll with a smooth surface and an embossing roll, the second polymer ply B facing the embossing roll so that the embossing roll gives the second polymer ply B a corresponding surface roughness. Alternatively or additionally, a surface roughness can be provided by means of the constituents of the first and second polymer plies A and B.

Accordingly, in one embodiment, the polymer ply B comprises cavities. The cavities preferably have a main extent in the range of 0.1 to 100 µm, for instance 0.5 µm to 25 µm, 0.5 µm to 10 µm or 1 µm to 5 µm. The porosity, caused by cavities, of the heat-shrinkable film is preferably 5 to 40 percent by volume, for example 10 to 30 percent by volume, for instance 15 to 20 percent by volume. A person skilled in the art is familiar with various processes for producing cavities in polymers, for example introducing gas under elevated pressure into a corresponding polymer during the production process and subsequent depressurisation, or introducing gas-releasing reagents during the production process. A further process consists in providing a mixture of polymers which are incompatible owing to different surface tensions and/or melt viscosities, and stretching this mixture at appropriate temperatures at which these effects manifest themselves. A polymer is a base material to which a cavity-forming additive is added in the form of a second polymer or polymer mixture with a different surface tension and/or melt viscosity which is incompatible with the polymer of the base material, as a cavity-forming agent. Ultimately, the combination of the base material and the cavity-forming additive is a mixture which tends to form cavities when stretched.

For example, the polymer of the base material, in relation to a polymer ply such as the first polymer ply A or the second polymer ply B, makes up 60-95 wt % of the respective polymer ply, and the additive added as the cavity-forming agent, for example a polymer or polymer mixture, accounts for up to 40 wt %, for example up to 30 wt %, for instance 5 to 30 wt %, or in particular 5 to 25 wt %, of the same ply. Such systems are known to a person skilled in the art of polyesters, for example, and are described in patents EP 1692226 B1, EP 169227 B1 and EP 1833886 B1. In relation to the total weight of the respective polymer ply, for example up to 15 wt % can be taken up by the at least one dark pigment and the at least one white pigment and/or further additives.

If the heat-shrinkable film is in the form of a polyester film, an example of a polyester base material for the polyester ply B is the polyester Embrace™ LV sold by Eastman Chemical Company. According to the above statements, this base material accounts for a proportion of, for example, 60 to 95 wt % of the polyester ply. To this base material is added the cavity-forming additive Embrace™ HY 1000 manufactured by Eastman Chemical Company, for example in a proportion of up to 40 wt %, for example up to 30 wt %, for instance 5 to 30 wt %, in particular 5 to 25 wt %, for instance 15 wt % to 22 wt % or 17 wt % to 20 wt %. In the production of a heat-shrinkable film, a pre-film comprising the first polyester ply A and the second polyester ply B is stretched, the polyester of type Embrace™ HY 1000 forming cavities inside the polyester of type Embrace™ LV owing to different surface tensions and/or melt viscosities.

If there are corresponding cavities at the surface of the second polyester ply B of a heat-shrinkable film, the dome-like or else depressed or undulating covering of the cavities advantageously results in paper-like haptics. If polymers having different melt viscosities and/or surface tensions are used, the cavities which result in corresponding paper-like haptics are necessarily produced during stretching, as a result of which it is advantageously ensured that the heat-shrinkable film actually has corresponding cavities.

Independently of the type of production of cavities, the porosity caused by the cavities results in light-scattering effects and light-reflecting effects, so that light shone into the second polymer ply B at a surface cannot pass unhindered to the opposite surface. Rather, the light is at least partially deflected inside the second polymer ply B, which benefits the intended low light transmission of the film of not more than 12%. Furthermore, the cavities advantageously help to reduce the density of the heat-shrinkable film, and therefore the latter is more lightweight overall, which in turn makes the storage, transport and further handling of the film easier.

The density of cavity-containing polymer films, in particular with regard to polyester films, is for example in the range of 0.90 to 1.40 g/cm$^3$, for instance 1.00 to 1.20 g/cm$^3$.

The first polymer ply A can be free of cavities or likewise have cavities. A first polymer ply A with cavities reinforces the above-mentioned advantageous effects of the low light transmission and the reduction in density. If the first polymer ply A likewise has cavities, the porosity thereof caused by the cavities can be different from the porosity of the second polymer ply B.

According to a particular embodiment, however, the first polymer ply A and the second polymer ply B have an identical porosity. In particular if the first polymer ply A and the second polymer ply B are substantially based on the same polymers, and the second polymer ply B is directly adjacent to the first polymer ply A, the ply adhesion between these two plies can be improved if both plies comprise largely identical constituents. In the case of heat-shrinkable films in which the cavities in the second polymer ply B are formed on the basis of a mixture of two polymers with different melt viscosities and/or surface tensions, it is thus advantageous if there is likewise a comparable mixture in the first polymer ply A. Furthermore, in this case, both plies advantageously have approximately the same tensile strengths, in contrast to heat-shrinkable films with different porosities in two different plies with which the ply with the greater porosity has a lower tensile strength owing to the structural weakening caused by the cavities. According to one embodiment, the second polymer ply B of the heat-shrinkable film can be printed on. It has been established that even embodiments which have paper-like haptics and a corresponding roughness, for example a roughness Rz in the range of 4 to 6 µm, have a good ability to be printed on.

Accordingly, printing ink adheres well to the surface while at the same time the surface having a roughness allows motifs to be printed with sufficient detail. For printing before heat-shrinking of the film, the proportions of the motif of the print are preferably selected such that the motif is reproduced correctly after heat-shrinking of the heat-shrinkable film is complete.

According to one embodiment, the first polymer ply A and the second polymer ply B of the heat-shrinkable film comprise, independently of each other, a polyester, polyester mixtures also being included. The polyester of the first polymer ply A and the polyester of the second polymer ply B are independent of each other and therefore can be identical or different. The polyester of the first polymer ply A and of the second polymer ply B is the main polymer in relation to the weight percentage inside the respective ply, and therefore any polymers other than polyesters are present in a lower weight percentage inside the respective polymer ply. Preferably, the polyester makes up at least 50 wt % of the respective polymer ply, in particular at least 70 wt %, at least 75 wt %, at least 80 wt %, at least 85 wt % or at least 90 wt %. According to a particular embodiment, no polymers other than polyesters are present in the respective polymer ply. The weight percentage of the at least one dark pigment in the heat-shrinkable film is preferably from 0.3 wt % to 1.5 wt %, according to a particular embodiment from 0.3 wt % to 1.0 wt %.

According to a particular example of a cavity-containing heat-shrinkable film, the first polyester ply A and/or the second polyester ply B comprise or consist of the polyester Embrace™ LV, sold by Eastman Chemical Company, as the base material. This base material makes up a proportion, for example, of 60 to 95 wt % of the respective polyester ply A or B. To this base material is added the cavity-forming additive Embrace™ HY 1000 manufactured by Eastman Chemical Company, for example in a proportion of up to 40 wt %, for example up to 30 wt %, for instance 5 to 30 wt %, in particular 5 to 25 wt %. In the production of a heat-shrinkable film, a pre-film comprising the first polyester ply A and the second polyester ply B is stretched, the polyester of type Embrace™ HY 1000 added to the polyester of type Embrace™ LV forming cavities inside the polyester of type Embrace™ LV owing to different surface tensions and/or melt viscosities, as already explained.

The opacity caused by the cavities contributes to a lower light transmission but also reduces the stiffness of the film, which has a disadvantageous effect in particular if the film becomes difficult to handle during possible further processing, for example during formation of a hose and/or during wrapping of an object. Since the first polyester ply A of the heat-shrinkable films provided herein comprises at least one dark pigment with which an outstandingly low light transmission can be effected, it has been found that a lower proportion of not more than 25 to 30 wt % of Embrace™ HY 1000 is sufficient, the obtained heat-shrinkable film advantageously having a high stiffness which is not adversely affected by excessively high porosity and still has a low density.

According to one embodiment, the first polymer ply A and the second polymer ply B of the heat-shrinkable film comprise, independently of each other, a polyolefin, polyolefin mixtures also being included. The polyolefin of the first polymer ply A and of the second polymer ply B are independent of each other and therefore can be identical or different. The polyolefin of the first polymer ply A and of the second polymer ply B is the main polymer in relation to the weight percentage inside the respective ply, and therefore any polymers other than polyolefins are present in a lower weight percentage inside the respective polymer ply. Preferably, the polyolefin makes up at least 50 wt % of the respective polymer ply, in particular at least 70 wt %, at least 75 wt %, at least 80 wt %, at least 85 wt % or at least 90 wt %. According to a particular embodiment, no polymers other than polyolefins are present in the respective polymer ply. The weight percentage of the at least one dark pigment in the heat-shrinkable film is preferably from 0.3 wt % to 1.5 wt %, according to a particular embodiment from 0.3 wt % to 1.0 wt %.

According to particular examples, the polyolefins are polyethylene, in particular LDPE and/or LLDPE, which may also comprise vinyl acetate, acrylates and/or acrylic acid as comonomers.

According to one embodiment, the first polymer ply A and the second polymer ply B of the heat-shrinkable film comprise, independently of each other, a polystyrene, polystyrene mixtures also being included. The polystyrene of the first polymer ply A and of the second polymer ply B are independent of each other and therefore can be identical or different. The polystyrene of the first polymer ply A and of the second polymer ply B is the main polymer in relation to the weight percentage inside the respective ply, and therefore any polymers other than polystyrenes are present in a lower weight percentage inside the respective polymer ply. Preferably, the polystyrene makes up at least 50 wt % of the respective polymer ply, in particular at least 70 wt %, at least 75 wt %, at least 80 wt %, at least 85 wt % or at least 90 wt %. According to a particular embodiment, no polymers other than polystyrenes are present in the respective polymer ply. The weight percentage of the at least one dark pigment in the heat-shrinkable film is preferably from 0.3 wt % to 1.5 wt %, according to a particular embodiment from 0.3 wt % to 1.0 wt %.

According to particular examples, the polystyrenes are styrene butadiene copolymers which are sold under the names "Clearen 511L", "Clearen 631M" or "Clearen 740M" by Denka Kagaku Kogyo Kabushiki Kaisha (Tokyo, Japan), "K-Resin® SBC" by Chevron Phillips Chemical Company LLC (The Woodlands, Tex., USA), and/or various styrene butadiene copolymers offered under the brand name "Styrolux" by Styrolution GmbH (Frankfurt, Germany), and/or the system of "Styrolux S" and "Styrolux T" from Styrolution GmbH (Frankfurt, Germany).

According to one embodiment, the first polymer ply A and the second polymer ply B of the heat-shrinkable film comprise, independently of each other, a polyvinyl halide, polyvinyl halide mixtures also being included. The polyvinyl halide of the first polymer ply A and of the second polymer ply B are independent of each other and therefore can be identical or different. The polyvinyl halide of the first polymer ply A and of the second polymer ply B is the main polymer in relation to the weight percentage inside the respective ply, and therefore any polymers other than polyvinyl halides are present in a lower weight percentage inside the respective polymer ply. Preferably, the polyvinyl halide makes up at least 50 wt % of the respective polymer ply, in particular at least 70 wt %, at least 75 wt %, at least 80 wt %, at least 85 wt % or at least 90 wt %. According to a particular embodiment, no polymers other than polyvinyl halides are present in the respective polymer ply. The weight percentage of the at least one dark pigment in the heat-shrinkable film is preferably from 0.3 wt % to 1.5 wt %, according to a particular embodiment from 0.3 wt % to 1.0 wt %.

According to particular examples, the polyvinyl halides are polyvinyl chlorides. The first polymer ply A, which is accordingly a first polyvinyl halide ply A and in particular a first polychloride ply A, and the second polymer ply B, which is accordingly a second polyvinyl halide ply B and in particular a second polyvinyl chloride ply B, preferably contain, independently of each other, up to 25 wt % of one or more further polymers selected from acrylonitrile butadiene styrene, methylmethacrylate acrylonitrile butadiene styrene, chlorinated polyethylene, methylmethacrylate butadiene styrene, methylmethacrylate, polymethylmethacrylate and ethylene vinyl acetate.

The object is achieved according to a further aspect by a hose which comprises a heat-shrinkable film as described above. The hose can be produced using a procedure known in the art, in which two edges of a heat-shrinkable film are joined to each other. Production takes place for example by heat sealing or solution sealing starting from a heat-shrinkable film; the heat-shrinkable film can accordingly be sealed by heat or by solvent. Since the dark pigment is an integral constituent of the first polyester ply A and is not merely applied to the first polyester ply A in the form of a surface layer, it is ensured that an intact or largely intact ply containing dark pigment is still present in the obtained hose after the first polyester ply A has been joined to the second polyester ply B or to the first polyester ply A of the opposite edge of the heat-shrinkable film during sealing. The low light transmission of the heat-shrinkable film thus remains guaranteed. Alternatively, a corresponding heat-shrinkable film is produced as a blown film which emerges from an annular die of an extruder during the production process.

Such a hose can be used to wrap an object in a manner known in the art, the hose contracting and adapting to the contour of the object as a result of heat treatment.

The object is achieved according to a further aspect by an object which is provided with a heat-shrinkable film or a hose as described herein. Alternatively, the object can have such a film or hose after the heat-shrinking thereof, that is, a heat-shrinkable film or a hose which has been applied to the object by pulling it onto the object and subsequently heat-treating it to effect shrinkage, according to a routine procedure in the art. The film or the hose preferably at least partially wraps the object, for example a bottle or can, and effectively protects the surface of the object covered by the film or hose from the entry of light. An object which is provided with a heat-shrinkable film or a hose as described herein can advantageously be better supplied to a recycling process. With conventional solutions, the objects (for example foodstuff containers) are either themselves manufactured from a light-impermeable material or are transparent but provided with a corresponding light-impermeable printed layer. Consequently, only light-impermeable materials are obtained from the recycling itself, or the previously transparent material loses its transparency when is melted during a recycling process and the printed layer is then mixed with the transparent material. In contrast to this, the heat-shrinkable films described herein or the hoses manufactured therefrom provide a possibility of making a transparent object light-impermeable. When the object is recycled, the material of the films or hoses can be separated from the material of the transparent object by processes known in the art, for example on the basis of differing densities, so that the transparent material of the object can be used again as a transparent material after the recycling process.

According to one embodiment, the object has a heat-shrinkable film as described above and/or a hose as described above, the first polyester ply A facing the object and the second polyester ply B facing away from the object. The second polyester ply B is freely accessible on the surface of the object, and thus the surface of the second polyester ply B can be printed on, or an already applied print is easily visible to a user of the object. The second polyester ply B absorbs and/or deflects at least some of the incident light. Accordingly, a smaller proportion of light reaches the first polyester ply A, which is adjacent to the object and, owing to the dark pigment content thereof, helps largely to reduce the transmission and thus protects the object from incidence of light.

The object is achieved in a further aspect by a process for producing a heat-shrinkable film as described herein, the process comprising: providing a first polymer A which comprises at least one dark pigment; providing a second polymer B which comprises at least one white pigment; coextruding a pre-film comprising a first polymer ply A and a second polymer ply B; setting the pre-film to a stretching temperature; and stretching the pre-film to obtain a heat-shrinkable film.

The provided first polymer A and the provided second polymer B, where necessary with other components such as additives, are preferably supplied to an extruder in which they are melted according to a procedure known per se in the art and where necessary homogenised, and conveyed at a corresponding pressure to a feedblock. In the feedblock, also referred to as a coextrusion adapter, the two melt streams are merged in a defined manner and extruded via a slot die to form a flat melt film. If the heat-shrinkable film has, in addition to the first polymer ply A and the second polymer ply B, further plies which comprise polymers, corresponding melt streams are produced and merged and exit via the slot die. Alternatively, in what is known as die coextrusion, the melt streams are not already merged in a feedblock long before exiting but rather are brought together in a coextrusion die directly before exiting the extruder.

This melt film is transferred to a cooling roll and pulled out of the die at a speed predefined by the rotation speed of the cooling roll, as a result of which a pre-film comprising a first polymer ply A of the first polymer A and a second polymer ply B of the second polymer B is obtained and is cooled to below the glass transition temperature.

According to a first process variant, the cooled pre-film is heated again to a defined stretching temperature while still inside the same production plant, supplied to a stretching unit, and stretched according to the stretching parameters specified in each case. Stretching can take place in the machine direction (longitudinal direction) and/or in the transverse direction. Stretching in the machine direction is usually carried out by two or more roll pairs running at different speeds, while stretching in the transverse direction usually takes place by clamping the edges of the film onto a clip frame and increasing the distance between the edges by means of the clip frame. After stretching, the film is again cooled to a temperature below the glass transition temperature to preserve the orientation of the polyester molecules achieved by stretching the film, and is thus a heat-shrinkable film. The film is then rolled up and can, for example, be dispatched, or where necessary correspondingly finished or printed on.

According to a second process variant, the pre-film taken from the cooling roll of the production plant is rolled up and brought to a stretching unit. In the stretching unit, the pre-film is unrolled again, heated to a defined stretching temperature and stretched according to the stretching parameters defined in each case, as in the first process variant. Accordingly, stretching takes place in a chronologically and/or spatially separate manner from the production of the pre-film. Again, the heat-shrinkable film is then cooled to a temperature below the glass transition temperature, rolled up, and where necessary dispatched, finished and/or printed on.

The defined stretching temperature is above the glass transition temperature of both the first polymer A and the second polymer B and is, for example 5° C. to 30° C. higher than the higher of the two glass transition temperatures. Stretching preferably takes place with a stretching factor in a range of 2:1 to 7:1, that is, a stretch to a length twice to seven times the original length, for example in a range of 3.0:1 to 6.5:1, for instance 4:1 to 6:1 or approximately 5:1.

EXAMPLES

The examples are based on the following measurement methods, where necessary:

Determining the Shrinkage

In the context of the present invention, the shrinkage S[%] in percent denotes the difference between the length of the film in the respective shrinking or stretching direction before shrinking and after shrinking, in relation to the length before shrinking:

$$S[\%]=((\text{length before shrinking}-\text{length after shrinking})/(\text{length before shrinking}))*100.$$

Shrinking is triggered by introducing a rectangular film with a known starting length, for example with an edge length of 100 mm×100 mm, the edges of which run parallel to the machine direction and to the transverse direction, into a water bath at a temperature of 95° C. and determining the length of the film by means of a ruler after 15 seconds in this water bath and subsequent removal.

Determining the Thickness

The thickness is determined in accordance with DIN 53370 by means of a scanning device manufactured by Mitutoyo, Japan, type 543/250 B. For the point measurements, the film was placed between the open measurement faces of the scanning device, which were then closed in a shock-free manner. The thickness was read by the scanning device.

Transmission

The transmission is determined by means of the "BYK-Gardner haze-gard plus" measurement instrument (manufacturer: BYK-Gardner, Germany). The light source D65 was used and the total transmission according to standard ASTM 1003 was measured based on a spectral range of 400 nm to 750 nm, and an integral transmission value for the visible range was obtained. To measure the spectral transmission both in the visible range and in the UV range (360 nanometres to 750 nm), the spectrophotometer "color i7" (X-Rite, Grand Rapids, USA) was used in transmission mode to verify that the necessary low transmission values were maintained across the entire spectral range.

Determining the Degree of Whiteness

To determine the degree of whiteness, the L* value of the CIE L*a*b* colour space was determined according to the DIN 5033 standard family. To this end, the colour spectrophotometer "color i7" (manufacturer: X-Rite) was used in the "reflection" measurement mode within a measurement wave range of 400 nm to 750 nm, with the sample placed on a standard white background.

Roughness

The roughness was measured according to DIN EN ISO 4287. A Hommel T8000 tester manufactured by Hommelwerke GmbH (Villingen-Schwenningen, Germany) and a TKT 100/17 probe, or a type S2 Perthometer and two styluses RT 50 and RT 250 manufactured by Mahr GmbH, Germany were used. Dust- and grease-free, as flat as possible samples of a size of approximately DIN A6 were measured without any further pretreatment. The average roughness Rz was determined as an average from five individual roughness depths according to standard EN ISO 4287.

Determining the Gloss

Gloss values at 60° were determined according to DIN 67530.

Cavity Content (Pore Content)

The percentage of cavities in films according to the invention in which cavities form only after stretching is established by determining the density of a film before and after stretching. Since the mass of the film does not change as a result of stretching, the volume of the cavities can be calculated using the change in the density, according to the following formula:

$$\text{Cavity volume}[\%]=(1-(\text{density after stretching}/\text{density before stretching}))*100$$

To determine the density according to DIN EN ISO 1183-1 (Part 1: "Immersion method", April 2013), three samples are taken, which can have any shape and have a mass in the range of 1 to 2 g, as standard. The samples are immersed at a temperature in the range of 20-23° C. in distilled water which contains 0.1% of a surface-active agent (for example detergent) to remove the air bubbles on the surface of the samples (for example, film folded in any way). The samples are checked to ensure they are free of air bubbles. To determine the mass and temperature, measurement instruments having a weighing accuracy of less than 0.001 gram and ±0.5° C., respectively, are used; the reproducibility is approximately 0.005 g/cm$^3$.

If the density of the sample is >1.0 g/cm$^3$ and it therefore sinks on immersion in the distilled water, the density is determined as follows:

The density is determined as an average of 3 measurements according to the following equation: $DI=(m1*DIFI)/(m1-m2)$ [g/cm$^3$]

Where:

m1 stands for the determined mass of the sample in g in air, m2 stands for the determined mass of the sample in g immersed in the test liquid (according to the measurement method already reduced by the buoyancy of the sample holder), and DIFI stands for the density of the test liquid (water, 20° C., DIFI=0.998 g/cm$^3$)

If the density of the sample is ≤1.0 g/cm$^3$ and it therefore floats on immersion in the distilled water, the density is determined as follows:

The density is then—corrected by the weight—determined as an average of 3 measurements according to the following equation:

$$DI=(m1*DIFI)/(m1+m3-m4)[\text{g/cm}^3]$$

Where:

m1 stands for the determined mass of the sample in g in air, m3 stands for the determined mass of the weight in g in the test liquid, m4 stands for the determined mass of the sample (incl. the weight) in g immersed in the test liquid (see note for m2 above), and DIFI stands for the density of the test liquid (water, 20° C., DIFI=0.998 g/cm$^3$).

The individual values of the three measurements are averaged and statistically evaluated. Determining the crystallisation half-time The crystallisation half-time of the copolyester used in the first polymer ply A is determined with the aid of a differential scanning calorimeter (DSC). The differential scanning calorimeter (DSC) is a standard method for measuring thermal properties, in particular the phase transition temperatures of solids. In the present invention, the crystallisation half-time is established by heating 15 mg of the polyester to be measured to 290° C. then cooled to a predetermined temperature of 180 to 210° C. at a rate of 320° C. per minute in the presence of helium, and the time span necessary until reaching the isothermal crystallisation temperature or the crystallisation peak of the DSC curve is detected. The crystallisation half-time is determined using the plot of the crystallisation over time. The crystallisation half-time corresponds to the time necessary, at the predefined temperature of 180 to 210° C., after the initial phase of crystallisation to achieve 50% of the maximum achievable crystallinity in the sample.

Example 1—Comparison of Different Comparative Films and Four Films According to the Invention The following abbreviations are used in the examples below:
CE: Comparative example
LV: Embrace LV (manufacturer: Eastman Chemical Company)
HY: Embrace HY 1000 (manufacturer: Eastman Chemical Company)
AB: Antiblock masterbatch (manufactured by Clariant)
$TiO_2$-MB: Masterbatch containing titanium dioxide (procured from Sukano AG, Schindellegi, Switzerland or from Clariant Produkte (Deutschland) GmbH, Frankfurt/Main, Germany)
CB-MB: Masterbatch containing carbon black Titanium dioxide was added in the form of a PETG masterbatch with 70 wt % $TiO_2$ to the compositions indicated in the tables below for the comparative examples and the examples according to the invention, carbon black was added in the form of a PETG masterbatch with 25 wt % carbon black.

First, two single-ply films which are obtainable as specimens, have an identical composition and differ only in thickness were tested as comparative example 1 (CE1) and comparative example 2 (CE2). The mixture of 75% LV and 25% HY resulted after stretching in cavities which caused opacity of the heat-shrinkable film. The details of the film compositions and the results are shown in Table 1 below.

TABLE 1

|  | CE1 | CE2 |
| --- | --- | --- |
| Ply 1 | 75% LV | 75% LV |
|  | 25% HY | 25% HY |
| Ply 2 | — | — |
| Ply 3 | — | — |
| Thickness | 110 μm | 50 μm |
| Transmission | 13.3% | 28.3% |

For comparative example 2, the L* value was also determined, which was 96. The measured transmissions were more than 13% even at film thicknesses of 110 μm and therefore did not meet the requirements of light-tightness which must be met in particular for packaging light-sensitive foodstuffs. It was concluded therefrom that the necessary transmission values could not be achieved in single-ply, cavity-containing films without having to resort to film thicknesses which are unsuitable in practice.

Then, several tests were carried out with 3-ply films, in which different combinations of the use of HY in different concentrations and/or in different plies and of the use of titanium dioxide as a pigment providing a white colour and thus blocking light were tested.

The mixtures provided for the respective plies were supplied to an extruder in which they were melted, homogenised and conveyed to a feedblock at a corresponding pressure and at an extrusion temperature in the range of 240° C. to 180° C. In the feedblock, the respective melt streams are merged in a defined manner and extruded via a slot die to form a flat melt film. This melt film was transferred to a cooling roll and pulled out of the gap at the speed predefined by the rotation speed of the cooling roll, as a result of which a pre-film was obtained which was cooled to below the glass transition temperature.

The cooled pre-film was heated again to a defined stretching temperature in the range of 75° C. to 100° C. while still inside the same production plant, supplied to a stretching unit, and stretched with a stretching factor in the range of 4 to 6 according to the stretching parameters specified in each case. Stretching took place in the transverse direction. After stretching and cooling, the now heat-shrinkable films was used for the other tests.

The compositions of the film and the plies thereof according to comparative tests 3 to 7 and results of the tests are shown in Table 2 below.

TABLE 2

|  | CE2 | CE4 | CE5 | CE6 | CE7 |
| --- | --- | --- | --- | --- | --- |
| Ply 1 | 99.5% LV | 80% LV | 89.5% LV | 99.5% LV | 99.5% LV |
|  | 0.5% AB | 20% HY | 10% HY | 0.5% AB | 0.5% AB |
|  |  |  | 0.5% AB |  |  |
| Ply 2 | 70% LV | 80% LV | 75% LV | 70% LV | 70% LV |
|  | 30% HY | 20% $TiO_2$-MB | 25% HY | 15% HY | 30% $TiO_2$-MB |
|  |  |  |  | 15% $TiO_2$-MB |  |
| Ply 3 | 99.5% LV | 80% LV | 89.5% LV | 99.5% LV | 99.5% LV |
|  | 0.5% AB | 20% HY | 10% HY | 0.5% AB | 0.5% AB |
|  |  |  | 0.5% AB |  |  |
| Thickness | 12.5 μm | 4 μm | 4 μm | 4 μm | 4 μm |
|  | 25 μm | 32 μm | 32 μm | 32 μm | 32 μm |
|  | 12.5 μm | 4 μm | 4 μm | 4 μm | 4 μm |
| Transmission | 30.3% | 35.1% | 32.4% | 31.6% | 37.1% |

The figures relating to titanium dioxide given in Table 2 relate to the weight percentage of the corresponding masterbatch, which contains 70 wt % titanium dioxide (TiO$_2$-MB).

A transmission of not more than 15% was not achieved with any of the compositions.

Then, films according to the invention having two plies were tested, of which one ply contained carbon black by addition of the above-indicated, carbon-black-containing masterbatch and thus corresponded to the first polymer ply A comprising at least one dark pigment, in the form of a first polyester ply A. To cover the black colour caused by the carbon-black-containing ply, the other ply contained titanium dioxide by addition of the above-indicated, titanium-dioxide-containing masterbatch and thus corresponded to the second polymer ply B comprising at least one white pigment, in the form of a second polyester ply B. When the second polyester ply B was viewed from above, a perfectly printable, white surface could be seen, which completely covered the underlying first polyester ply A in terms of colour. The exact composition and the obtained results are shown in Table 3.

TABLE 3

|  | Inventive example 1 | Inventive example 2 | Inventive example 3 | Inventive example 4 |
|---|---|---|---|---|
| Ply 1 (corresponding to ply B) | 70% LV<br>20% HY<br>10% TiO$_2$-MB | 73% LV<br>17% HY<br>10% TiO$_2$-MB | 70% LV<br>30% TiO$_2$-MB | 70% LV<br>20% HY<br>10% TiO$_2$-MB |
| Ply 2 (corresponding to Ply A) | 67% LV<br>12% HY<br>9% TiO$_2$-MB<br>12% CB-MB | 62% LV<br>17% HY<br>9% TiO$_2$-MB<br>12% CB-MB | 77% LV<br>10% TiO$_2$-MB<br>12% CB-MB<br>1% AB | 71% LV<br>17% HY<br>9% TiO$_2$-MB<br>3% CB-MB |
| Ply 3 | — | — |  |  |
| Thickness | 32 μm | 32 μm | 32 μm | 32 μm |
| Ply B Ply A | 8 μm | 8 μm | 8 μm | 8 μm |
| Transmission | 0.7% | 0.9% | 1.3% | 6.3% |

The films according to the invention exhibited a light transmission of less than 10% and in some cases even less than 5%; even values below 1% could be achieved with a low film thickness of 40 μm in total. The measurements were carried out using the "BYK-Gardner haze-gard plus" measurement instrument; the film according to inventive example 2, for example, was measured with the "color i7" spectrophotometer, and transmissions of well below 0.1% were established for the range of 360 to 400 nm. The films were therefore also usable for critical applications in the food industry in which light-perishable foodstuffs must be protected. For inventive example 2, the L* value was also determined, which was 90.

In view of this degree of whiteness, the B ply of the film was sufficiently white to allow a printing ink to be applied without being influenced by the substrate.

Example 2—Further Parameters of the Film According to the Invention

In the obtained film according to the invention, the gloss at 60° according to test specification ASTM D-523, the roughness and the peak count (number of profile peaks per 10 mm reference length) were determined. The results are shown in comparison with paper, standard copy paper being used, in Table 4 below.

TABLE 4

|  | Paper | Film according to inventive example 2 of Table 3 |
|---|---|---|
| Gloss 60° | 3.8 | 5.0 |
| RZ | 19.3 | 2.3 |
| Peaks per cm | 144 | 300 |

The film according to the invention did not have a smooth surface, which can result in slipping, in particular if an object wrapped in such a film is grasped with moist or wet hands. Rather, the haptics were perceived as paper-like, which was attributable to the peaks present on the surface of the film according to the invention, which were in turn caused by the proportion of cavity-forming additive "HY". Ply 1 of film 2 according to Table 3 corresponds to the second polymer ply B of the heat-shrinkable film. Ply 2 of inventive film 2 according to Table 3 corresponds to the first polymer ply A owing to its content of dark pigment in the form of carbon black. Since the first polymer play A and the second polymer ply B contained the same proportion of cavity-forming additive "HY", the porosity of the two plies was identical. The shrinkage of the film after 15 seconds in a water bath at a temperature of 95° C. was 67%.

Table 5 shows further property parameters of inventive film 2 from Table 3:

TABLE 5

| Parameter | Measurement standard | Unit | Typical value |
|---|---|---|---|
| Thickness | ISO 4593 | μm | 40 |
| Thickness tolerance |  | % | ±10 |
| Density | DIN EN ISO 1183-2 | g/cm$^2$ | 1.22 |
| Density tolerance |  | % | ±2 |
| Material yield at 40 μm | DIN EN ISO 2286-2 | m$^2$/kg | 20.5 |
| Shrinkage in transverse direction | DIN 53377<br>15 sec. in water at<br>95° C. | % | 67 |
| Shrinkage tolerance in transverse direction |  | pp | ±2 |
| Shrinkage in machine direction |  | % | −1 |
| Shrinkage tolerance in machine direction |  | pp | ±2 |
| Tensile strength in transverse direction | DIN EN ISO 527<br>V = 50 mm/min | MPa | 100 |
| Tensile strength in machine direction |  | MPa | 40 |
| E-modulus in transverse direction |  | MPa | 3400 |
| E-modulus in machine direction |  | MPa | 1500 |

Although the invention has been illustrated and explained in detail by means of preferred exemplary embodiments, the invention is not limited by the examples disclosed, and other variations can be derived therefrom by a person skilled in the art without departing from the scope of the invention. It is therefore clear that a large number of variation possibilities exists. It is likewise clear that embodiments mentioned by way of example are really only examples which should not be understood in any way as a limitation of the scope of protection or of the possibilities for using the invention. Rather, the above description enables a person skilled in the art to implement the exemplary embodiments in practice; in so doing, a person skilled in the art with knowledge of the disclosed concept of the invention can make various modifications, for example in terms of the function or the arrangement of individual elements mentioned in an exemplary embodiment, without departing from the scope of protection as defined by the claims and the legal equivalents, such as more detailed explanation in the description. It is likewise possible to combine different embodiments as described herein or individual features of embodiments.

INDUSTRIAL APPLICABILITY

The heat-shrinkable film and a hose comprising such a heat-shrinkable film are suitable, for example, for wrapping objects in a light-tight manner. Furthermore, an object wrapped in such a film or such a hose is suitable for accommodating light-sensitive foodstuffs.

The invention claimed is:
1. Heat-shrinkable, uniaxially stretched film consisting of:
a first polymer ply A which comprises at least one dark pigment;
a second polymer ply B which comprises at least one white pigment; and
at least one pigment ply consisting of pigments applied to the second polymer ply B,
wherein:
the first polymer ply A and the second polymer ply B, independently of each other, comprise one or more polymers which are selected from the group of the polyesters, polyolefins, polystyrenes and polyvinyl halides,
the film has a thickness of 20 µm to 100 µm,
the thickness ratio of the first polymer ply A to the second polymer ply B is in the range 5:95 to 50:50,
the light transmission of the film is not more than 12%, and
the film after 15 seconds in a water bath having a temperature of 95° C. exhibits shrinkage in a main shrinking direction in the range of 20% to 85%.
2. Heat-shrinkable film according to claim 1, wherein the second polymer ply B has an L* value of at least 85.
3. Heat-shrinkable film according to claim 1, wherein at least one of the surfaces which face away from each other of the first polymer ply A and of the second polymer ply B is smooth.
4. Heat-shrinkable film according to claim 1, wherein the second polymer ply B can be printed on.
5. Heat-shrinkable film according to claim 1, wherein the first polymer ply A and the second polymer ply B, independently of each other, comprise a polyester.
6. Heat-shrinkable film according to claim 1, wherein the first polymer ply A and the second polymer ply B, independently of each other, comprise a polyolefin.
7. Heat-shrinkable film according to claim 1, wherein the first polymer ply A and the second polymer ply B, independently of each other, comprise a polystyrene.
8. Heat-shrinkable film according to claim 1, wherein the first polymer ply A and the second polymer ply B, independently of each other, comprise a polyvinyl halide.
9. Heat shrinkable film according to claim 1, wherein the second polymer ply B has a roughness Rz of more than 2.00 µm, preferably a roughness Rz in the range of 4 µm to 6 µm.
10. Heat-shrinkable film according to claim 9, wherein the second polymer ply B has a roughness Rz of more than 2.00 µm, preferably a roughness Rz in the range of 4 µm to 6 µm.
11. Heat-shrinkable, un axially stretched film consisting of
a first polymer ply A which comprises at least one dark pigment and at least one white pigment; and
a second polymer ply B which comprises at least one white pigment,
wherein:
the first polymer ply A and the second polymer ply B, independently of each other, comprise one or more polymers which are selected from the group of the polyesters, polyolefins, polystyrenes and polyvinyl halides,
the film has a thickness of 20 µm to 100 µm,
the thickness ratio of the first polymer ply A to the second polymer ply B is in the range 5:95 to 50:50,
the light transmission of the fila is not more than 12%, and
the film after 15 seconds in a water bath having a temperature of 95° C. exhibits shrinkage in a main shrinking direction in the range of 20% to 85%.
12. Heat-shrinkable film according to claim 11, wherein the second polymer ply B has an L* value of at least 85.
13. Heat-shrinkable film according to claim 11, wherein at least one of the surfaces which face away from each other of the first polymer ply A and of the second polymer ply B is smooth.
14. Heat-shrinkable film according to claim 11, wherein the second polymer ply B can be printed on.
15. Heat-shrinkable film according to claim 11, wherein the first polymer ply A and the second polymer ply B, independently of each other, comprise a polyester.
16. Heat-shrinkable film according to claim 11, wherein the first polymer ply A and the second polymer ply B, independently of each other, comprise a polyolefin.
17. Heat-shrinkable film according to claim 11, wherein the first polymer ply A and the second polymer ply B, independently of each other, comprise a polystyrene.
18. Heat-shrinkable film according to claim 11, wherein the first polymer ply A and the second polymer ply B, independently of each other, comprise a polyvinyl halide.
19. Heat-shrinkable film according to claim 11, wherein the second polymer ply B has a roughness Rz of more than 2.00 µm, preferably a roughness Rz in the range of 4 µm to 6 µm.
20. Heat-shrinkable film according to claim 19, wherein the second polymer ply B has a roughness Rz of more than 2.00 µm, preferably a roughness Rz in the range of 4 µm to 6 µm.

* * * * *